United States Patent
Taglienti et al.

(10) Patent No.: US 7,610,396 B2
(45) Date of Patent: Oct. 27, 2009

(54) SYSTEM AND METHOD FOR MEASURING AND RECORDING LATENCY IN INTERNET PROTOCOL NETWORKS

(75) Inventors: Claudio Taglienti, Barrington Hills, IL (US); Sebastian Thalanany, Buffalo Grove, IL (US); Narothum Saxena, Hoffman Estates, IL (US); Michael Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 860 days.

(21) Appl. No.: 10/750,010

(22) Filed: Dec. 31, 2003

(65) Prior Publication Data

US 2005/0148314 A1 Jul. 7, 2005

(51) Int. Cl.
*G06F 15/16* (2006.01)
(52) U.S. Cl. .................. 709/233; 709/223; 709/230; 455/423; 370/310
(58) Field of Classification Search .......... 707/223, 707/233; 370/310; 455/423
See application file for complete search history.

(56) References Cited

U.S. PATENT DOCUMENTS

| 6,215,774 | B1 | 4/2001 | Knauerhase et al. | 370/252 |
|---|---|---|---|---|
| 6,493,328 | B2 | 12/2002 | Fong et al. | 370/329 |
| 6,751,193 | B1 * | 6/2004 | Kudrimoti et al. | 370/231 |
| 6,928,280 | B1 * | 8/2005 | Xanthos et al. | 455/423 |
| 7,290,056 | B1 * | 10/2007 | McLaughlin, Jr. | 709/230 |
| 2002/0127993 | A1 * | 9/2002 | Zappala | 455/404 |
| 2004/0260831 | A1 * | 12/2004 | Dyck et al. | 709/233 |
| 2005/0148314 | A1 * | 7/2005 | Taglienti et al. | 455/403 |

OTHER PUBLICATIONS

3GPP2 X.S0011-001-C, "3rd Generation Partnership Project 2 '3GPP2' for cdma2000 Wireless IP Network Standard: Introduction", *3GPP2 and its Organizational Partners*, Aug. 2003, 25 pgs.

3GPP2 X.S0011-002-C, "3rd Generation Partnership Project 2 '3GPP2' for cdma2000 Wireless IP Network Standard; Simple IP and Mobile IP Access Services", *3GPP2 and its Organizational Partners*, Aug. 2003, 43 pgs.

(Continued)

*Primary Examiner*—Tonia L Dollinger
*Assistant Examiner*—Kyung H Shin
(74) *Attorney, Agent, or Firm*—Leydig, Voit & Mayer, Ltd.

(57) ABSTRACT

A system and method for measuring and recording latency in data networks. The system and method can be used to measure and record latency in a Simple IP network or a Mobile IP network. One embodiment of the present invention is a system and method for measuring latency between a first device and a second device, the first and second devices communicating in accordance with a communications specification. The system and method comprises the second device transmitting, during a communication session, a message to the first device; receiving a response message from the first device; computing an elapsed time from transmission of the message to receipt of the response message to determine the latency; and recording the latency in a latency parameter. The message and the response message are provided by the communications specification.

35 Claims, 4 Drawing Sheets

OTHER PUBLICATIONS

3GPP2 X.S0011-003-C, "3$^{rd}$ Generation Partnership Project 2 '3GPP2' for cdma2000 Wireless IP Network Standard: Packet Data Mobility and Resource Management", *3GPP2 and its Organizational Partners*, Aug. 2003, 29 pgs.

3GPP2 X.S0011-004-C, "3$^{rd}$ Generation Partnership Project 2 '3GPP2' for cdma2000 Wireless IP Network Standard: Quality of Service and Header Reduction", *3GPP2 and its Organizational Partners*, Aug. 2003, 44 pgs.

3GPP2 X.S0011-005-C, "3$^{rd}$ Generation Partnership Project 2 '3GPP2' for cdma2000 Wireless IP Network Standard: Accounting Services and 3GPP2 Radius VSAs", *3GPP2 and its Organizational Partners*, Aug. 2003, 47 pgs.

3GPP2 X.S0011-006-C, "3$^{rd}$ Generation Partnership Project 2 '3GPP2' for cdma2000 Wireless IP Network Standard: PrePaid Packet Data Service", *3GPP2 and its Organizational Partners*, Aug. 2003, 34 pgs.

Yu Chen and Terrance Boult, "Dynamic Home Agent Reassignment in Mobile IP", 2002, 5 pgs.

* cited by examiner

SYSTEM AND METHOD FOR MEASURING AND RECORDING LATENCY IN INTERNET PROTOCOL NETWORKS

FIELD OF THE INVENTION

The present invention relates generally to data networks, such as internet protocol networks, and more particularly, to a system and method for measuring and recording latency in a data network.

BACKGROUND OF THE INVENTION

While tools do exist today which measure latency in a data network, such as a wireless data network, this functionality is not integrated into the set of services provided by wireless networks today. Furthermore these tools are used to measure latency at the equipment level, not at the user session level.

In wireless networks, a mobile station is connected to a radio access node via a wireless or radio frequency (RF) network. The radio access node is then connected to the data network (e.g., the Internet) typically via a wire-line network. The radio frequency network is frequently the most unreliable part of the end-to-end connection. Bad connections or a high volume of voice calls in the sector will affect the quality of data calls and thus increase latency. Thus, it is important for service providers to be able to measure wireless access latency at the user session level from the mobile station to the radio access node (i.e., the packet data serving node or PDSN).

Accounting information is generated for data calls, providing information such as the number of bytes transferred for a given data session and the session duration. However, currently nothing is generated which measures user experience on a per user, per session basis.

Accordingly, there is a need for a system and method for measuring and recording latency in a data network on a per user, per session basis.

SUMMARY OF THE INVENTION

A system and method for measuring and recording latency in data networks, such as internet protocol (IP) networks. The system and method can be used to measure and record latency in a Simple IP network or a Mobile IP network. One aspect of the invention utilizes control plane messages for measuring latency to avoid the messages associated with the latency measurements from being billed to the user.

One aspect of the invention is a system and method for measuring and recording latency between a mobile station (MS) and a packet data serving node (PDSN) or foreign agent (FA). Another aspect of the invention is for measuring and recording latency between the PDSN/FA and a home agent (HA). Latency information can be made available for billing, statistical and reporting purposes.

One embodiment of the present invention is a system and method for measuring latency between a first device and a second device, the first and second devices communicating in accordance with a communications specification. The method comprises the second device transmitting, during a communication session, a message to the first device; receiving a response message from the first device; computing an elapsed time from transmission of the message to receipt of the response message to determine the latency; and recording the latency in a latency parameter in a data record. The system comprises a first device and a second device adapted for communicating in accordance with a communications specification. The second device is adapted for transmitting, during a communication session, a message to the first device; receiving a response message from the first device; computing an elapsed time from transmission of the message to receipt of the response message to determine the latency; and recording the latency in a latency parameter in a data record. The message and the response message are provided by the communications specification.

Another embodiment of the present invention is a system and method, performed by a packet data serving node, for measuring latency. The method comprises the packet data serving node storing a first start time; transmitting, to a mobile station, a Link Control Protocol Echo message; receiving a Link Control Protocol Echo Response message from the mobile station; storing a first stop time; and computing a wireless access latency based on the first start time and the first stop time. In a related embodiment, the method further comprises the packet data serving node storing a second start time; transmitting, to a home agent, a Mobile IP Registration Request message; receiving a Mobile IP Registration Reply message from the home agent; storing a second stop time; and computing an internet access latency based on the second start time and the second stop time. In another related embodiment, the step of computing the internet access latency further comprises adjusting the internet access latency for a processing time associated with the home agent.

The system comprises a mobile station and a packet data serving node. The packet data serving node is adapted for wirelessly communicating with the mobile station, transmitting a link control protocol echo message to the mobile station, receiving a link control protocol response message from the mobile station, and computing an elapsed time from transmission of the link control protocol echo message to receipt of the link control protocol response message to determine the wireless access latency. In a related embodiment, the system comprises a home agent and a packet data serving node for communicating with the home agent. The packet data serving node is adapted for transmitting a mobile internet protocol registration request message to the home agent, receiving a mobile internet protocol registration reply message from the home agent, and computing an elapsed time from transmission of the mobile internet protocol registration request message to receipt of the mobile internet protocol registration reply message to determine the internet access latency.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers and in which.

DETAILED DESCRIPTION

Figure 1:
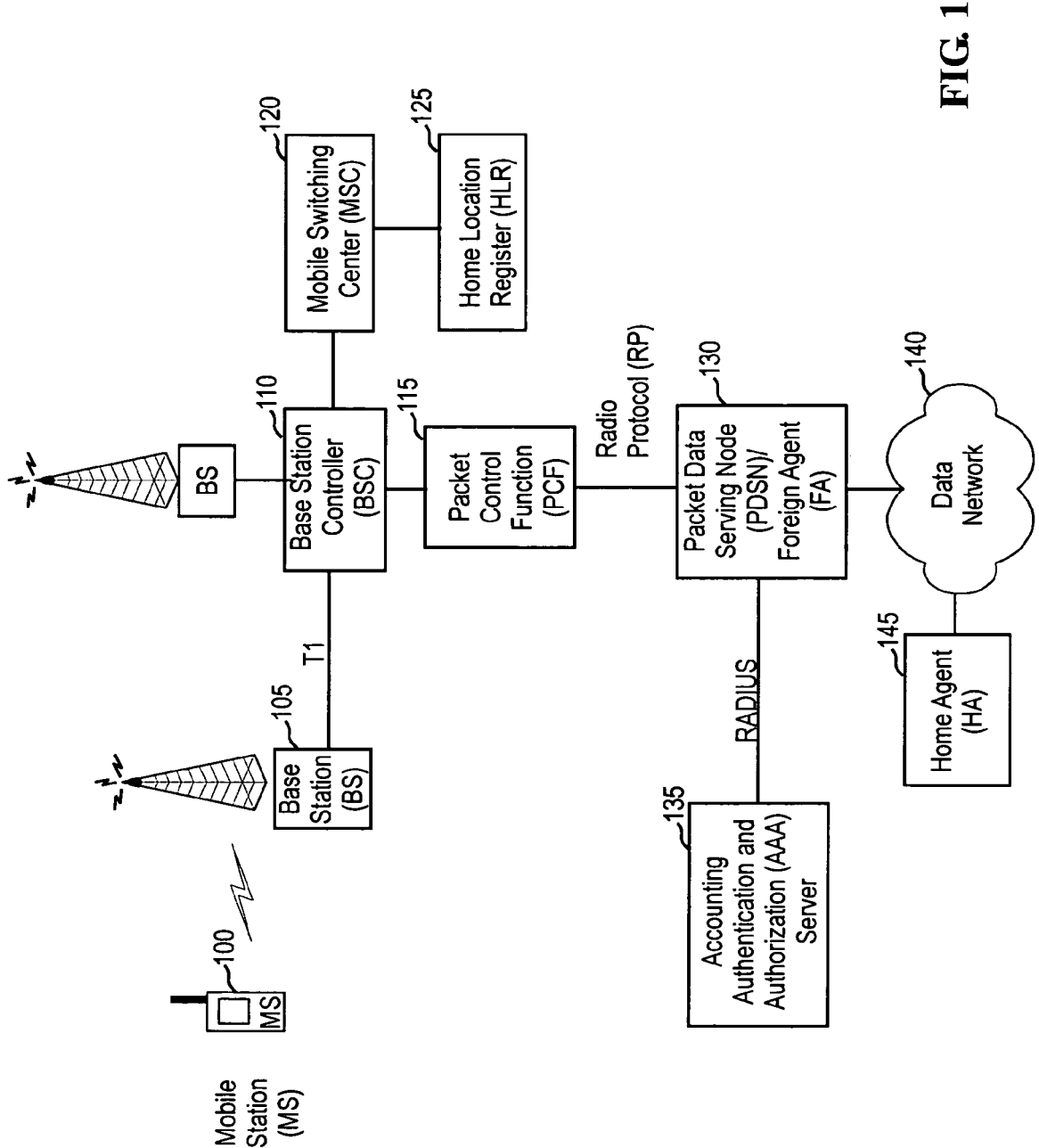
FIG. 1 is a schematic illustration of a data network in accordance with the present invention.

FIG. 1 schematically illustrates a representative environment of the present invention. A mobile station (MS) 100

(e.g., a cellular phone or a wireless data terminal) is wirelessly connected to a base station (BS) 105 via a radio frequency (RF) network. The base station 105 is connected to a base station controller (BSC) 110, typically via a wire-line, such as a T1 line. The base station controller 110 is configured for connecting to and controlling multiple base stations 105. The base station controller 110 is connected to a Packet Control Function (PCF) 115, which typically resides proximate the base station controller 110. The base station controller 110 is also connected to a Mobile Switching Center (MSC) 120, which is connected to a Home Location Register (HLR) 125.

The PCF 115 is connected to a mobility agent, such as a packet data serving node (PDSN) 130 via the data network using the Radio Protocol (RP). The PDSN 130 is connected to an accounting authentication and authorization (AAA) server 135 via the data network using the Remote Authentication Dial In User Service (RADIUS) protocol. In a Simple IP network the PDSN 130 is connected to an Internet Protocol (IP) network, such as the Internet. In a Mobile IP system, the PDSN 130 is also connected to a Home Agent (HA) 145 via the data network 140, using Mobile IP protocol.

In one embodiment, the PDSN 130 provides the mobile station 100 with access to the Internet, intranets and application servers utilizing a cdma2000 Radio Access Network. The PDSN 130 is capable of performing two basic functions: (1) exchanging packets with the mobile station 100 over the RF network, and (2) exchanging packets with other IP networks 140. The PDSN 130 is capable of interfacing with the AAA server 135 to provide the mobile station 100 with a gateway to the IP network 140.

In Mobile IP applications, wherein the mobile station 100 is capable of roaming outside of its home network, the PDSN 130 is capable of interfacing with home agents (HA) 145. An HA 145 is typically a router located on the mobile station's home network, which is capable of tunneling packets to the mobile station while it is away from the home network. The PDSN 130 is capable of acting as a foreign agent (FA) on behalf of home agents to enable service providers to provide Mobile IP services to roaming mobile stations 100. The FA can register the mobile station 100 with their particular HA 145 and provide a forwarding address for data delivery. The PDSN/FA 130 is typically a router located on a foreign network that is capable of de-tunneling the packets from the HA 145 and providing the packets to the mobile station 100 via the RF network.

In data applications, a data call is typically routed through a voice network. The Mobile Switching Center 120, in conjunction with the a Home Location Register (HLR) 125 determines that the call is a data call and sends the call back to the Base Station Controller 110, which then routes the call through the PDSN 130 to the data network 140.

Figure 2:
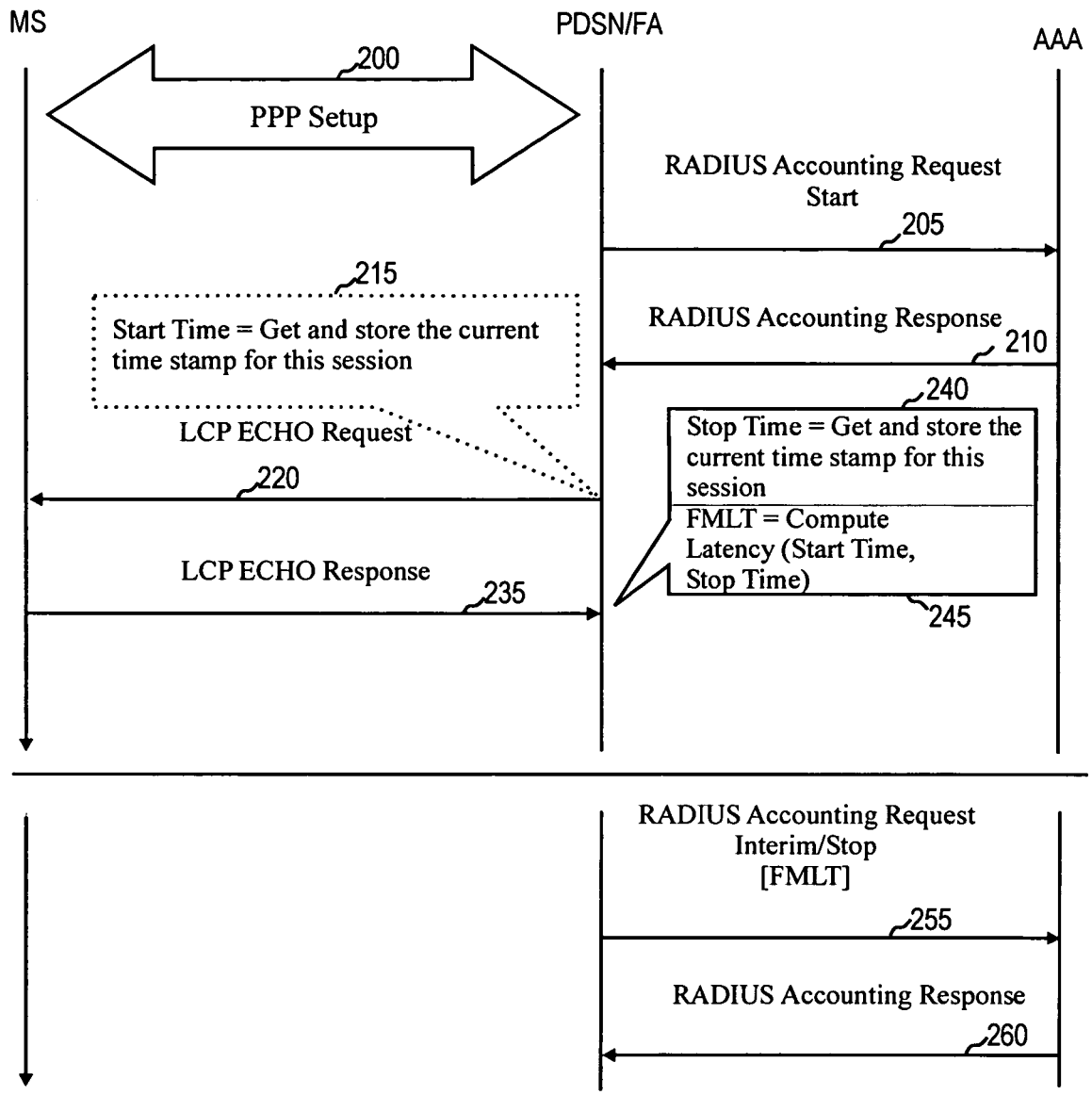
FIG. 2 is a flow diagram illustrating a message sequence for measuring wireless access latency in a Simple IP network in accordance with the present invention.

FIG. 2 illustrates a message sequence for measuring wireless access latency in a simple IP network. In one embodiment of the present invention, a radio access node or mobility agent like the PDSN can perform measurement of wireless access latency. The radio access node can compute a round trip delay between itself and the mobile station by measuring a time interval from the time the radio access node sends a message to the mobile station to the time the radio access node receives a response from the mobile station. In one embodiment, the message and response are provided by a communications standard for use between the radio access node and the mobile station. In a preferred embodiment, the message and response are control plane messages which do not affect session data usage (billable bytes over bearer) and thus do not increase the end user charges.

In a preferred embodiment wherein the radio access node is a PDSN 130 utilizing cdma2000 in accordance with the TIA/IS 835-B standard, the PDSN 130 utilizes link control protocol (LCP) messages as outlined in TIA/IS 835-B to measure the wireless access latency. The round trip delay or FA to MS Latency Time in milliseconds (FMLT), is the time interval measured from the time the PDSN/FA 130 sends the mobile station 100 an LCP Echo Request message to the time the PDSN/FA 130 receives the LCP Echo Response message from the mobile station 100.

The TIA/IS 835-B standard provides for the LCP Echo Request and Response messages. Thus, the PDSNs 130 and mobile stations 100 support the LCP messages. The TIA/IS 835-B standard outlines using these LCP messages only in the context of detecting mobile station 100 availability following point-to-point protocol (PPP) session inactivity. The present invention, however, advantageously uses these LCP messages to measure wireless access latency. Utilizing messages provided for by the standard allows the system and method of the present invention to be compatible with existing standards, and further, to be backward compatible with existing deployed solutions. Using messages provided by the standard simplifies implementation in the currently deployed wireless network infrastructure equipment and also minimizes taxing the network infrastructure.

The LCP Echo messages can be sent to the mobile station 100 and used to measure wireless access latency under the following conditions: (1) when a point-to-point protocol (PPP) session is successfully established; (2) when the PPP Inactivity Timer expires; and optionally, (3) when a configurable Wireless Access Latency Timer in the PDSN expires.

In one embodiment, an LCP Echo Request/Response message exchange is sent when the PPP connection is established. While this message exchange is provided for by the TIA/IS 835-B standard, the present invention advantageously monitors both the time that the LCP Echo Request message is sent and the time that the LCP Echo Response message is received in order to measure the wireless access latency. The elapsed time (in milliseconds) from the sending of the LCP Echo Request message to the receipt of the LCP Echo Response message can then be recorded in the FMLT parameter for transmission to the AAA server 135. Repeated exchanges of these messages between the mobile station 100 and the PDSN 130 can then be sent when the PPP Inactivity Timer expires, and optionally, when the Wireless Access Latency Timer expires.

The Wireless Access Latency Timer is not provided by the TIA/IS 835-B standard, but can be implemented in the PDSN 130 and used to trigger the wireless access latency measurement. The PPP Inactivity Timer is provided in the TIA/IS 835-B standard, and can be used in addition to or instead of the Wireless Access Latency Timer (depending on whether the Wireless Access Latency Timer is implemented) to trigger the LCP Echo Request message to the mobile station 100 after a PPP session is established. Because these timers are configurable in the PDSN 130, the service provider can have complete control over the number of samples desired to compute latency at the user session level.

The RADIUS protocol provides for a Usage Data Record (UDR) having certain parameters, which can be used for accounting and billing purposes. In one embodiment, start, stop, and interim usage data records are transmitted from the PDSN to the AAA server at the start of a communications session, at the end of the communications session, and during the communications session.

The RADIUS protocol also allows new parameters to be added to the UDR. In one embodiment, the PDSN 130 is capable of adding a new accounting parameter attribute, the FMLT (also part of this invention), as a field in the Usage Data Record (UDR) of the PDSN 130. The PDSN 130 can then send the UDR, containing the FMLT information, to the AAA server 135. The FMLT accounting parameter can be added, for example, in a Quality of Service section of the UDR. By adding the FMLT parameter to the UDR, latency information can thus be recorded in the AAA server 135 on a per-user, per-session basis. Recording of latency information can be advantageously performed in the context of an existing framework. The AAA server 135 can store the FMLT information for further processing by other network management entities (e.g., for billing, statistical and/or reporting purposes).

The LCP Echo Request/Response messages are control plane messages and thus will not be included as part of the data bearer usage calculations. Using the LCP messages to measure latency will not affect a user's session data usage and the user will not be billed for these messages.

The process for measuring Wireless Access Latency proceeds as follows. Once the PPP setup between the mobile station 100 and the PDSN/FA 130 has been completed (step 200), the PDSN/FA 130 sends a RADIUS Accounting Request Start message to the AAA server 135 (step 205). The AAA server 135 responds with a RADIUS Accounting Response message to the PDSN/FA 130 (step 210). The PDSN/FA 130 then gets and stores the current time stamp for this session in a StartTime parameter (step 215). The PDSN/FA 130 sends the LCP Echo Request message to the mobile station 100 (step 220). The mobile station 100 receives the LCP Echo Request message and, in response, returns the LCP Echo Response message to the PDSN/FA 130.

The PDSN/FA 130 receives the LCP Echo Response message (step 235) and gets and stores the current time stamp for this session in a StopTime parameter (step 240). The PDSN/FA 130 then computes the Wireless Access Latency using the StartTime and StopTime parameters (step 245). The computed Wireless Access Latency is then assigned to an FMLT accounting parameter in, for example, a UDR of the PDSN 130. The PDSN 130 can then send the UDR with the FMLT parameter to the AAA server 135 in a RADIUS Accounting Request message (step 255). Once the message has been received, the AAA server 136 returns a RADIUS Accounting Response message to the PDSN 130 (step 260). No new functionality is required to be in the AAA server 135. The AAA server 135 can simply store the UDR for further processing by other network management entities.

Figure 3A:
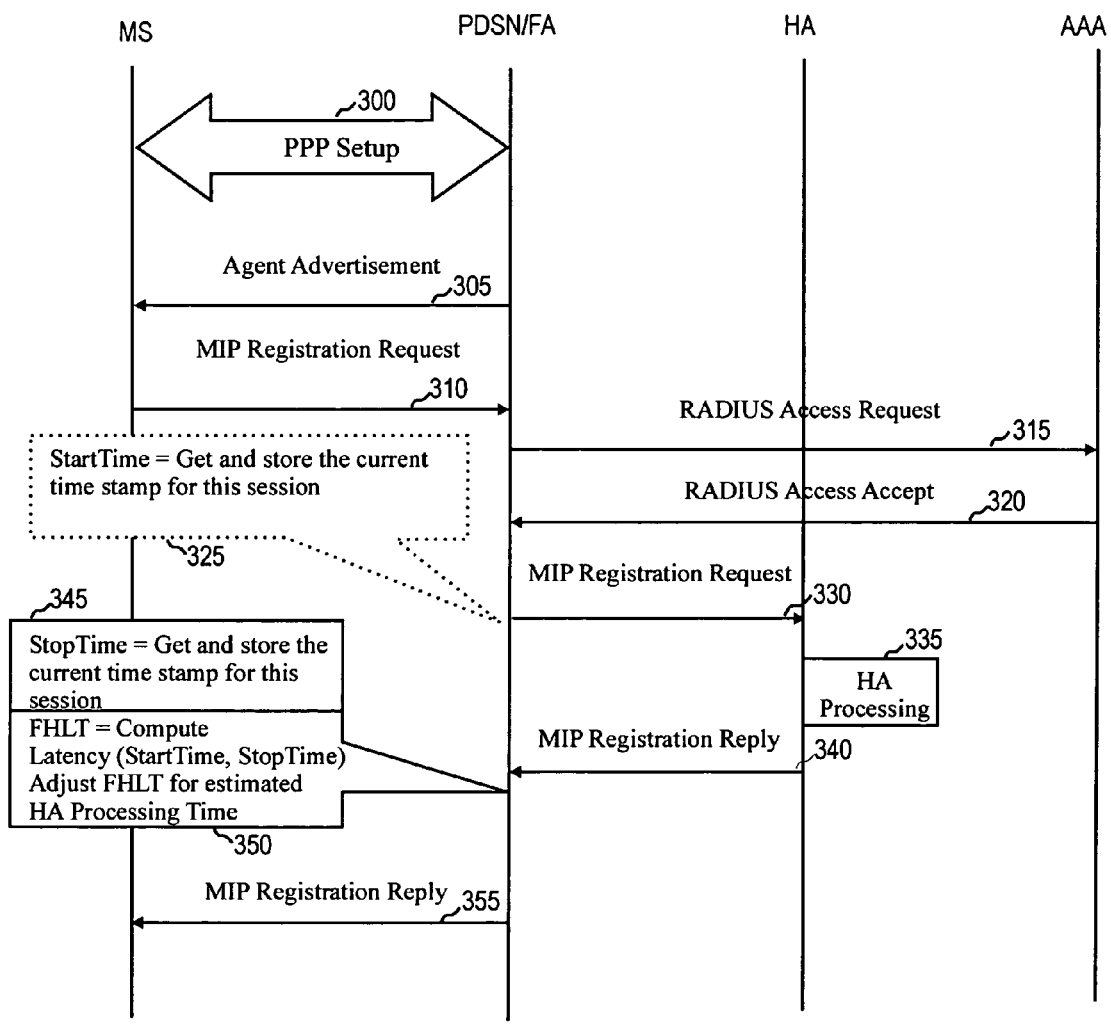
FIGS. 3A and 3B are flow diagrams illustrating a message sequence for measuring internet access latency and wireless access latency in a Mobile IP network in accordance with the present invention.
Figure 3B:
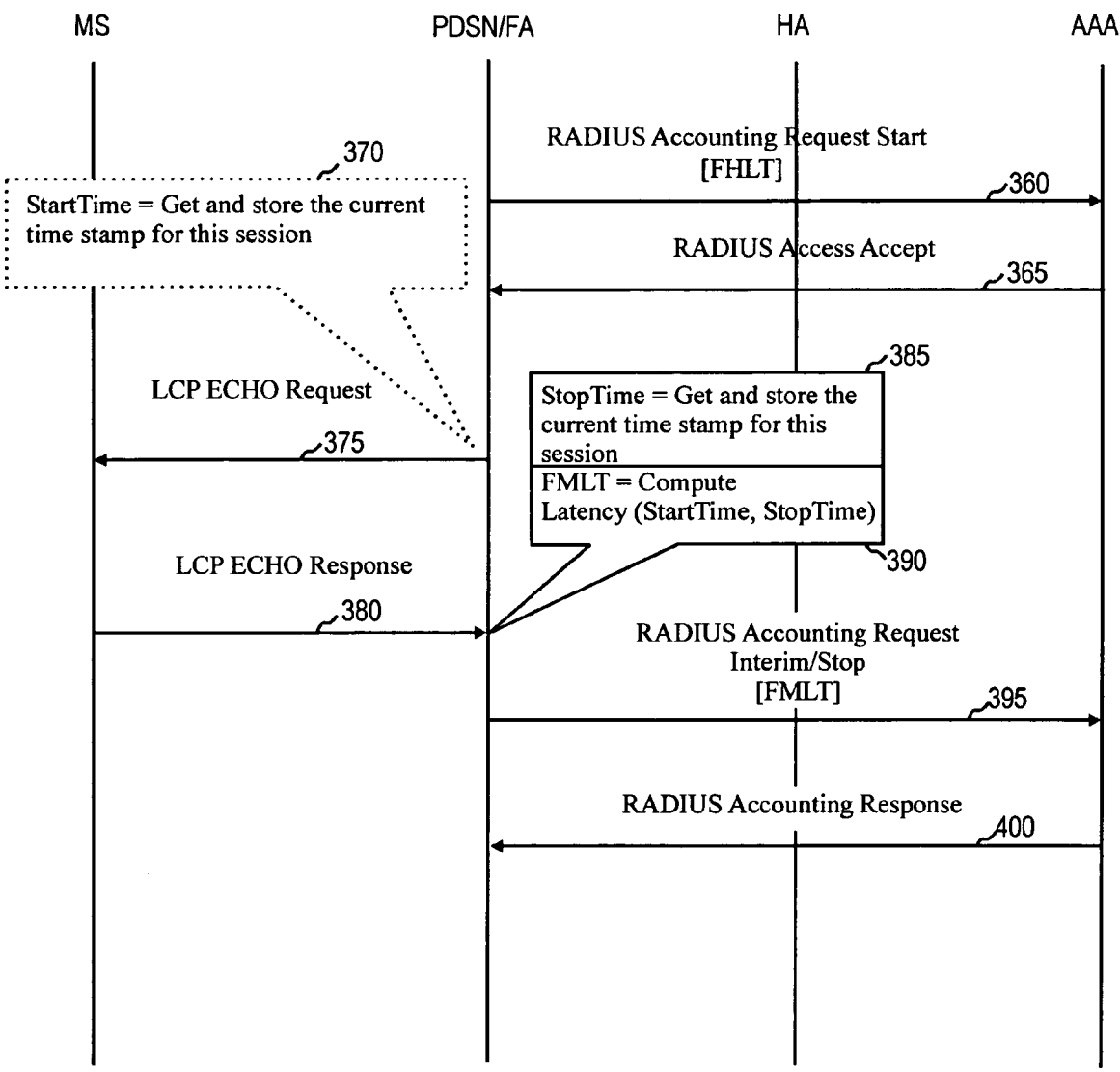

FIGS. 3A and 3B illustrate a message sequence for measuring latency in a mobile IP session. In mobile IP, an IP address of the mobile station 100 is anchored at its home agent (HA) 145. The mobile station 100 is thus able to keep the same IP address, and its connectivity to the network, as it moves from one PDSN 130 to another. The mobile station's HA 145 forwards messages destined for the mobile station 100 to a foreign agent (FA) 130 via a Mobile IP network. The FA 130 then routes the messages to the mobile station 100 using the RF network.

Two types of latency exist in Mobile IP networks: Wireless Access Latency and Internet Access Latency. Wireless Access Latency is measured using the FMLT parameter discussed above. Internet Access Latency can be measured by utilizing messages transmitted between the FA 130 and the HA 145 (in accordance with a communications standard), taking into account any processing time required by the HA 145 before responding to the message.

In one embodiment, the messages used for measuring Internet Access Latency are control plane messages which do not affect session data usage (billable bytes over bearer) and thus do not increase the end user charges. In a preferred embodiment, Internet Access Latency can be measured using Mobile IP (MIP) Registration messages outlined in TIA/IS 835-B. Utilizing messages provided for by the standard allows the system and method of the present invention to be compatible with existing standards, and further, to be backward compatible with existing deployed solutions. Using messages provided by the standard simplifies implementation in the currently deployed wireless network infrastructure equipment and also minimizes taxing the network infrastructure.

In the context of Internet Access Latency, the round trip delay or FA to HA Latency Time in milliseconds (FHLT), is the time interval measured from the time the PDSN (acting as an FA) 130 sends the HA 145 a Mobile IP (MIP) Registration Request Message to the time the PDSN/FA 130 receives the MIP Registration Reply message from the HA 145. The HA 145 may require some processing time to process the MIP Registration Request Message, before returning the MIP Registration Reply message. If so, the processing time required by the HA 145 (or an estimate of the processing time) can be subtracted from the total round trip delay to arrive at the FHLT. The MIP Registration Request/Reply messages are provided in TIA/IS 835-B for establishing and maintaining a Mobile IP user session between the mobile station 100 and the HA 145. The present invention, however, advantageously uses these MIP Registration messages to measure Internet access latency up to the edge of the service provider network where the HA node is located. In general the MS, based on TIA/IS 835-B, will register with the HA:

After receiving an Agent Advertisement from the PDSN due to initial establishment of a PPP session with this PDSN; and Before expiration of the MIP Lifetime timer in the PDSN and HA.

In one aspect of the invention for a Mobile IP scenario, the LCP Echo messages are used to measure wireless access latency as was the case for Simple IP under the following conditions: (1) after reception of Mobile IP Registration Reply; (2) when the PPP Inactivity Timer expires; and optionally, (3) when a configurable Wireless Access Latency Timer in the PDSN expires.

The Wireless Access Latency Timer is not provided by the TIA/IS 835-B standard, but can be implemented in the PDSN 130 and used to trigger the wireless access latency measurement. The PPP Inactivity Timer is provided in TIA/IS 835-B standard, and can be used in addition to or instead of the Wireless Access Latency Timer (depending on whether the Wireless Access Latency Timer is implemented) to trigger the LCP Echo message to the MS. Because these timers are configurable in the PDSN 130, the service provider can have complete control over the number of samples desired to compute latency at the user level.

In one embodiment, the PDSN 130 is capable of adding a new accounting parameter attribute, the FHLT (round trip delay from FA to HA in milliseconds), to the Usage Data Record (UDR) of the PDSN 130. The PDSN 130 can then send the UDR, containing the FHLT information (and optionally the FMLT information), to the AAA server 135. The FHLT accounting parameter can be added, for example, in a Quality of Service section of the UDR. By adding the FHLT parameter to the UDR, latency information can thus be recorded in the AAA server 135 on a per-user, per-session basis and in the context of an existing framework. The AAA server 135 can store the FHLT information (and optionally the FMLT information) for further processing by other network management entities (e.g., for billing, statistical and/or reporting purposes).

The MIP Registration messages are control plane messages. Thus, the messages will not be included, as part of the data bearer usage calculations and the user will not be billed for these messages.

The process for measuring wireless and internet access latency in a mobile IP network proceeds as follows. Once the PPP setup between the mobile station 100 and the PDSN/FA 130 has been completed (step 300), the FA 130 advertises its existence to the mobile station 100 (step 305). The mobile station 100 is thus able to discover whether it is at home or away from home depending on whether it is communicating with an HA 145 or a FA 130. The mobile station 100 then sends an MIP Registration Request to the PDSN/FA 130 (step 310). The PDSN/FA 130 then authenticates the MS using a RADIUS Access Request message to the AAA server 135 (step 315). The AAA server 135 responds with a RADIUS Access Accept message (step 320).

The PDSN/FA 130 gets and stores the current time stamp for this session in a StartTime parameter (step 325) and sends an MIP Registration Request to the HA 145 (step 330). The HA 145 receives the MIP Registration Request and, after processing the request (step 335), returns an MIP Registration Reply message to the PDSN/FA 130. The PDSN/FA 130 receives the MIP Registration Reply message (step 340) and gets and stores the current time stamp for this session in a StopTime parameter (step 345). The PDSN/FA 130 then computes the Internet Access Latency using the StartTime and StopTime parameters, adjusting the result by an estimate of the time required by the HA to process the request (i.e, the estimated HA processing time) (step 350). The computed Internet Access Latency is then assigned to an FHLT accounting parameter in, for example, a UDR of the PDSN/FA 130. After the PDSN/FA 130 receives the MIP Registration Reply from the HA 145, the PDSN/FA 130 sends the MIP Registration Reply to the mobile station 100 (step 355).

The PDSN/FA 130 then sends a RADIUS Accounting Request Start message containing the FHLT parameter to the AAA server 135 (step 360). The AAA server 1350 responds with a RADIUS Access Accept message (step 365). The PDSN/FA 130 gets and stores the current time stamp for this session in a StartTime parameter (step 370). The PDSN/FA 130 then sends the LCP Echo Request message to the mobile station 100 (step 375). The mobile station 100 receives the LCP Echo Request message and, in response, returns the LCP Echo Response message to the PDSN/FA 130. The PDSN/FA 130 receives the LCP Echo Response message (step 380) and gets and stores the current time stamp for this session in a StopTime parameter (step 385).

The PDSN/FA 130 then computes the Wireless Access Latency using the StartTime and StopTime parameters (390). The computed Wireless Access Latency is then assigned to the FMLT (FA to MS Latency Time in milliseconds) accounting parameter in, for example, a UDR of the PDSN 130. The PDSN 130 can then send the FMLT to the AAA server 135 in a RADIUS Accounting Request message step 395). Once the message has been received, the AAA server 135 returns a Radium Accounting Response message to the PDSN 130 (step 400).

The latency measurements described herein, including the wireless access latency and the internet access latency measurements provide a way to measure and record user experience in conducting a data call. These measurements can also be used as a way to measure the effect on user experience, if any, of new equipment that is introduced into the network.

Using control plane messages to measure latency provides an advantage in that the customer's data usage is not affected. Thus, no billing system changes in the service provider network are needed to incorporate this functionality. Further, by determining latency and therefore quality of service at a per user, per session level, the present invention makes it possible for a service provider to bill a user for providing a particular promised quality of service.

By measuring latency at a per user per session level, a service provider can determine and improve the quality of its wireless infrastructure, and can further improve the user's experience. Certain technologies, such as Voice over IP (VoIP), real time streaming, etc., that are particularly susceptible to latency will benefit from the ability to measure latency at the user session level.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A method for measuring latency between a first device and a second device during a user data session, said first and second devices communicating in accordance with a communications specification, said method comprising:

transmitting, during a user data session between said first and second devices, a message from said second device to said first device, said message being in accordance with said communications specification, said communications specification associated with a mobile telephone network;

during the user data session, receiving a response message from said first device, said response message being in accordance with said communications specification;

computing, during the user data session, an elapsed time from transmission of said message to receipt of said response message to determine said latency at a per-user-per session level based on a round trip delay evidenced by the elapsed time, said latency being computed by a network management element of the mobile telephone network and comprising at least one of a first latency component and a second latency component;

adding an accounting parameter field to a usage data record associated with the data session, the accounting parameter field comprising at least one of: an FMLT accounting parameter attribute associated with the first latency component and an FHLT accounting parameter attribute associated with the second latency component, wherein the first latency component represents a wireless access delay perceived by the network management element, and the second latency component represents an internet access delay between at least two network management elements, the usage data record provided by the communications specification, wherein the accounting parameter field extends the communications specification;

recording said latency in the accounting parameter field, the usage data record capable of being stored in computer readable memory of a server, the server configured to determine data usage in connection with the user data session and;

generating, by the server, a billing record for the user based on the latency recorded in the accounting parameter field for the user data session, the server processing the latency to bill the user based on a predetermined quality of service promised to the user.

2. A method in accordance with claim 1, wherein said message and said response message are control plane messages.

3. A method in accordance with claim 1, wherein said message and said response message do not affect the data usage of said first device.

4. A method in accordance with claim 1, further comprising:
transmitting said usage data record containing said latency to said server.

5. A method in accordance with claim 1, wherein said first device and said second device are adapted to communicate wirelessly using said communications specification.

6. A method in accordance with claim 1, wherein said first device and said second device are adapted to communicate via a wire-line portion of the mobile telephone network using said communications specification.

7. A method in accordance with claim 1, wherein said first device is a mobile station and said second device is a mobility agent.

8. A method in accordance with claim 1, wherein said first device is a home agent and said second device is a mobility agent.

9. A method in accordance with claim 1, wherein said message and said response message are link establishment protocol messages.

10. A method in accordance with claim 1, wherein said step of transmitting is performed after said communication session has been established.

11. A method in accordance with claim 1, wherein said step of transmitting is performed upon the expiration of a timer.

12. A method in accordance with claim 11, wherein said timer is provided by said communications specification.

13. A method in accordance with claim 11, wherein said timer is not provided by said communications specification, said method further comprising:
implementing said timer in said second device, said timer configured to expire during said communication session.

14. The method of claim 1 wherein the first device is a mobile station and the second device is a packet data serving node.

15. The method of claim 1 wherein the message from the second device is a Link Control Protocol Echo message and the response message from the first device is a Link Control Protocol Echo Response message.

16. The method of claim 1 further comprising:
storing a start time;
transmitting, to a home agent, a Mobile IP Registration Request message;
receiving a Mobile IP Registration Reply message from the home agent;
storing a stop time; and
computing the internet access delay based on said start and stop times.

17. The method of claim 16, wherein said step of computing said internet access delay further comprises adjusting said internet access delay for a processing time associated with said home agent.

18. The method of claim 17, wherein said processing time is an estimated processing time.

19. A system for measuring latency during a user data session carried out in accordance with a communications specification, said communications specification associated with a mobile telephone network, the system comprising:

a first device adapted for communicating in accordance with said communications specification;

a second device comprising a network management element of the mobile telephone network and adapted for communicating with said first device in accordance with said communications specification and for transmitting a message to said first device during the user data session, receiving a response message from said first device during the user data session, computing, during the user data session, an elapsed time from transmission of said message to receipt of said response message to determine said latency at a per-user-per-session level based on a round trip delay evidenced by the elapsed time, said latency comprising at least one of a first latency component and a second latency component, and recording said latency in an accounting parameter field of a usage data record stored in a first computer readable memory; and a server for storing the usage data record in a second computer readable memory, the server configured to determine data usage in connection with the user data session to generate a billing record for the user based on the latency recorded in the accounting parameter field for the user data session, the server processing the latency to bill the user based on a predetermined quality of service promised to the user;

wherein said message and said response message are provided by said communications specification and said second device is capable of extending said communications specification by adding said accounting parameter field including said latency to the usage data record, the accounting parameter field comprising at least one of: an FMLT accounting parameter attribute associated with the first latency component and an FHLT accounting parameter attribute associated with the second latency component, wherein the first latency component represents a wireless access delay perceived by the network management element, and the second latency component represents an internet access delay between at least two network management elements.

20. A system in accordance with claim 19, wherein said message and said response message are control plane messages.

21. A system in accordance with claim 19, wherein said message and said response message do not affect the data usage of said first device.

22. A system in accordance with claim 19, wherein said server is connected to said second device, said second device further adapted for transmitting said usage data record containing said latency to said server.

23. A system in accordance with claim 19, wherein said first device and said second device are adapted to communicate wirelessly using said communications specification.

24. A system in accordance with claim 19, wherein said first device and said second device are adapted to communicate via a wire-line portion of said mobile telephone network using said communications specification.

25. A system in accordance with claim 19, wherein said first device is a mobile station and said second device is a mobility agent.

26. A system in accordance with claim 19, wherein said first device is a home agent and said second device is a mobility agent.

27. A system in accordance with claim 19, wherein said message and said response message are link establishment protocol messages.

28. A system in accordance with claim 19, wherein said second device is adapted to transmit said message upon the expiration of a timer.

29. A system in accordance with claim 28, wherein said timer is provided by said communications specification.

30. The system of claim 19 wherein the first device is a mobile station and the second device is a packet data serving node.

31. The system of claim 19 wherein said latency is the internet access delay and wherein further the first device is a home agent and the second device is a packet data serving node.

32. The system of claim 19 wherein the message from the second device is a Link Control Protocol Echo message and the response message from the first device is a Link Control Protocol Echo Response message.

33. The system of claim 19 wherein said latency is the internet access delay and wherein further the message from the second device is a Mobile Internet Protocol Registration Request message and the response message from the first device is a Mobile Internet Protocol Registration Reply message.

34. The system of claim 33, wherein said second device is a packet data serving node adapted to adjust said internet access latency for a processing time associated with said first device, said first device comprising a home agent.

35. The system of claim 34, wherein said processing time is an estimated processing time.

* * * * *

UNITED STATES PATENT AND TRADEMARK OFFICE
CERTIFICATE OF CORRECTION

PATENT NO. : 7,610,396 B2 Page 1 of 1
APPLICATION NO. : 10/750010
DATED : October 27, 2009
INVENTOR(S) : Taglienti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this

Twelfth Day of October, 2010

David J. Kappos
*Director of the United States Patent and Trademark Office*